(12) United States Patent
Palacios

(10) Patent No.: US 6,239,067 B1
(45) Date of Patent: May 29, 2001

(54) PROCESS AND APPARATUS FOR THE PRODUCTION OF ACTIVATED CARBON

(75) Inventor: Francisco Salvador Palacios, Salamanca (ES)

(73) Assignee: Universidad de Salamanca, Salamanca (ES)

( * ) Notice: Subject to any disclaimer, the term of this patent is extended or adjusted under 35 U.S.C. 154(b) by 0 days.

(21) Appl. No.: 09/209,439

(22) Filed: Dec. 10, 1998

(30) Foreign Application Priority Data

Jul. 23, 1998 (ES) .................................................. 9801552

(51) Int. Cl.$^7$ ...................................................... C01B 31/12
(52) U.S. Cl. ............................................ 502/432; 502/180

(58) Field of Search ........................ 423/445 R; 502/180, 502/421, 432, 433

(56) References Cited

U.S. PATENT DOCUMENTS 5,908,896 * 6/1999 Mayer et al. .................... 502/418 X

* cited by examiner

*Primary Examiner*—Stuart Hendrickson
(74) *Attorney, Agent, or Firm*—Bryan Cave LLP

(57) ABSTRACT

Process for the production of activated carbon, which comprises the stages of carbonizing the starting material and activating the carbonized material. Water and/or carbon dioxide in the supercritical state are employed, as activating agents, in the activation stage of the carbonized material.

5 Claims, 2 Drawing Sheets

PROCESS AND APPARATUS FOR THE PRODUCTION OF ACTIVATED CARBON

This invention relates to a process for the production of activated carbon using water or supercritical carbon dioxide as activating agents for the carbonized starting material. The invention also relates to an apparatus for carrying out said process.

As is well known, activated carbon is a porous carbonaceous material, with a very developed internal surface, between 300 and 3000 m$^2$/g, which has a great capacity to adsorb gases and substances dissolved in liquids.

With regard to the physical-chemical nature of activated carbon, there are two general properties which are responsible for the adsorptive nature of this material. These properties are: a) the pore size distribution and the surface area; and b) the chemical reactivity of the surface.

The first commercial activated carbons were prepared from wood and peat. In fact, any carbonaceous material can be employed to obtain activated carbons. Thus, wood, coals, lignites, peat, coconut, almond, walnut or hazelnut shells, and the stones of fruits (peach, plum, olive, etc.) are used. Out of these those favored by the manufacturers are wood, coal, lignite, peat and coconut shells.

The choice of the raw material is based upon criteria such as:

Quality of the activated carbon.

Low mineral matter content.

Availability and cost.

Degradation during storage.

Ease of activation.

According to the state of the art, the industrial scale manufacture of activated carbon is essentially comprised of two stages: a) Carbonization of the raw material; and b) Activation of the carbonized product.

The properties of the end product depend upon: a) the nature of the raw material; b) the activating agent; c) the time and temperature of the activation process. Out of these variables, the last two are also important at the time of obtaining an activated carbon which is easy to regenerate (ease in desorbing the adsorbed substances in order to return its original adsorptive properties to the activated carbon).

During the carbonization stage, the starting material is heated in an inert atmosphere (free of oxidants) at a high temperature, over 800° C. During this stage, the raw material is pyrolysed and a basic porous structure is developed. In this process, most of the noncarbonaceous elements, hydrogen, oxygen and nitrogen are eliminated in the form of gaseous products. The liberated atoms of elemental carbon rearrange themselves in ordered crystallographic formations known as elementary graphite crystals. The rearrangement of the crystals is irregular, therefore leaving free interstices between them. Apparently, as a result of the deposition and decomposition of tarry substances, these interstices begin to fill up, or at least become blocked by disordered carbon. In general, the product of carbonization known as char, is a virtually inactive material with a relatively low surface area (from 1 to 50 m$^2$/g).

When the raw material used in obtaining activated carbon has thermoplastic properties (case of the bituminous coals, lignins and others), a prior oxidation step is required to decrease or eliminate the plastic behavior, if a precursor of activated carbon with a suitable porous development has to be generated during the carbonization step. The oxidation is carried out in the gas phase by means of oxidating atmospheres (oxygen, air, carbon dioxide) at temperatures of the order of 200° C., or otherwise in solution with conventional chemical agents. Oxidation, in the event of it being necessary is generally carried out before the carbonization step. Gentle oxidative treatments are common during the cooling stages after the carbonization and activation steps, aimed at the physical-chemical conditioning of the surface of the final product. During the activation step, the char is subjected to the controlled action of oxidizing gases, such as steam, carbon dioxide or some mixture of these gases. This controlled oxidation takes place at temperatures between 800 and 1.100° C. The oxidant agent essentially burns the most reactive parts of the carbonaceous skeleton. The extent of the burning will depend upon the nature of the gas employed, the temperature and the activation time. The basic reactions involved in this stage are:

$$C+H_2O \rightarrow CO+H_2$$

$$C+CO_2 \rightarrow 2CO$$

Being these reactions endothermic, the activation operation is controlled by means of an external input of energy. The use of carbon dioxide as an activating agent usually demands higher temperatures which increase the cost of the process.

The activation rate with steam decreases due to the presence of the H$_2$ generated, which remains firmly adsorbed to the surface. The same happens when carbon dioxide is used, as the CO generated also remains adsorbed on the surface.

It has now been discovered, surprisingly, that the drawbacks derived from the use of said activating agents in the gaseous state, according to the state of the art, can be solved if said agents are substituted by water or carbon dioxide in a supercritical state.

Therefore, and according to an aspect of the present invention, a process is provided for the manufacture of activated carbon characterised by the use, as activating agent for the carbonized material, of water or/and carbon dioxide in supercritical state (critical point of water: T=374° C. and P=215 bar; critical point for carbon dioxide: T=31° C. and P=72 bar).

The special properties of supercritical water and carbon dioxide make these two activating agents more efficient and effective than when they are used in gaseous state.

According to the invention, for temperatures and pressures above the critical point, the physical properties of water are completely different from those of water in the liquid or vapor phase state. In the vicinity of the critical point, the density and viscosity decrease remarkably, increasing the diffusivity of its molecules and the mobility of other chemical species dissolved in it. Consequently, an improvement in mass transfer processes is achieved, making supercritical water an excellent reaction medium. On the other hand, the dielectric constant decreases from 78 to 5, typical value for apolar compounds, thus making water a good solvent for gases and organic compounds. Consequently, supercritical water has great ease in penetrating the porous structure of the char, being able to extract and transport to the outside the molecules of the activation products. Supercritical CO$_2$ exhibits a similar behavior.

The difference between carrying out the activation with steam or CO$_2$ or with supercritical water or CO$_2$ according to the present invention, is defined by these properties. Among others, it is worth noting the following differences:

When working under supercritical conditions, the high pressure makes the number of water or CO$_2$ molecules in contact with the surface of the char to be greater than when steam or $CO_2$ in the gaseous state are used. In this manner, the activation rate is increased.

The great ease which the molecules of the supercritical fluid have to penetrate the porous structure allows the activation reaction to take place simultaneously in the whole of the inner surface of the char. In this manner, the activation rate is increased and a uniform development of the porous structure of the resulting activated carbon is achieved.

The solubilisation of the gases from the activation reactions, together with their great diffusivity in the supercritical fluid, turns the supercritical phase into a homogeneous phase which facilitates the exchange with the char surface and transport in the porous structure.

In activation with supercritical fluids, it is possible to easily control the final characteristics of the activated carbon by selecting the experimental conditions under which the process takes place, such as the pressure, temperature, density, flow, time, etc.

The activation temperature is lower, which implies an important economic saving. Thus, in most of chars, activation with supercritical water begins at about 450° C. and its rate increases rapidly with temperature.

Another advantage in the use of these activating agents in the supercritical state, according to the present invention, is that, due to their solubilising power, compounds or impurities found in the char are extracted during the treatment, which are not removed using the traditional procedures for the preparation of activated carbon. Consequently, by using this process, a reduction in the sulphur and mineral compounds content is achieved. The result is activated carbon of greater purity with a lower ash content.

The extractive power of these two compounds in the supercritical state, according to the invention, is so great, that if the raw material has a high grade of carbonization, such as in the case of mineral coal, the preparation process of activated carbon can be carried out in a single step. In this sense, for example, when a semi-anthracite is treated with water and the temperature is progressively increased up to 500° C. at a pressure of 250 bar, a direct transformation into activated carbon is achieved.

On the other hand, according to another aspect, the present invention provides an apparatus to carry out the procedure for the manufacture of activated carbon according to the first aspect of the invention described above.

The apparatus according to the invention is essentially characterised in that it works in a continuous fashion, allowing, at the same time, the destruction of the extracted products and the recovery of the activating agent.

Both aspects, the process and the apparatus according to the invention will be described hereunder, referring to the diagrams enclosed, whereby:

Figure 1:
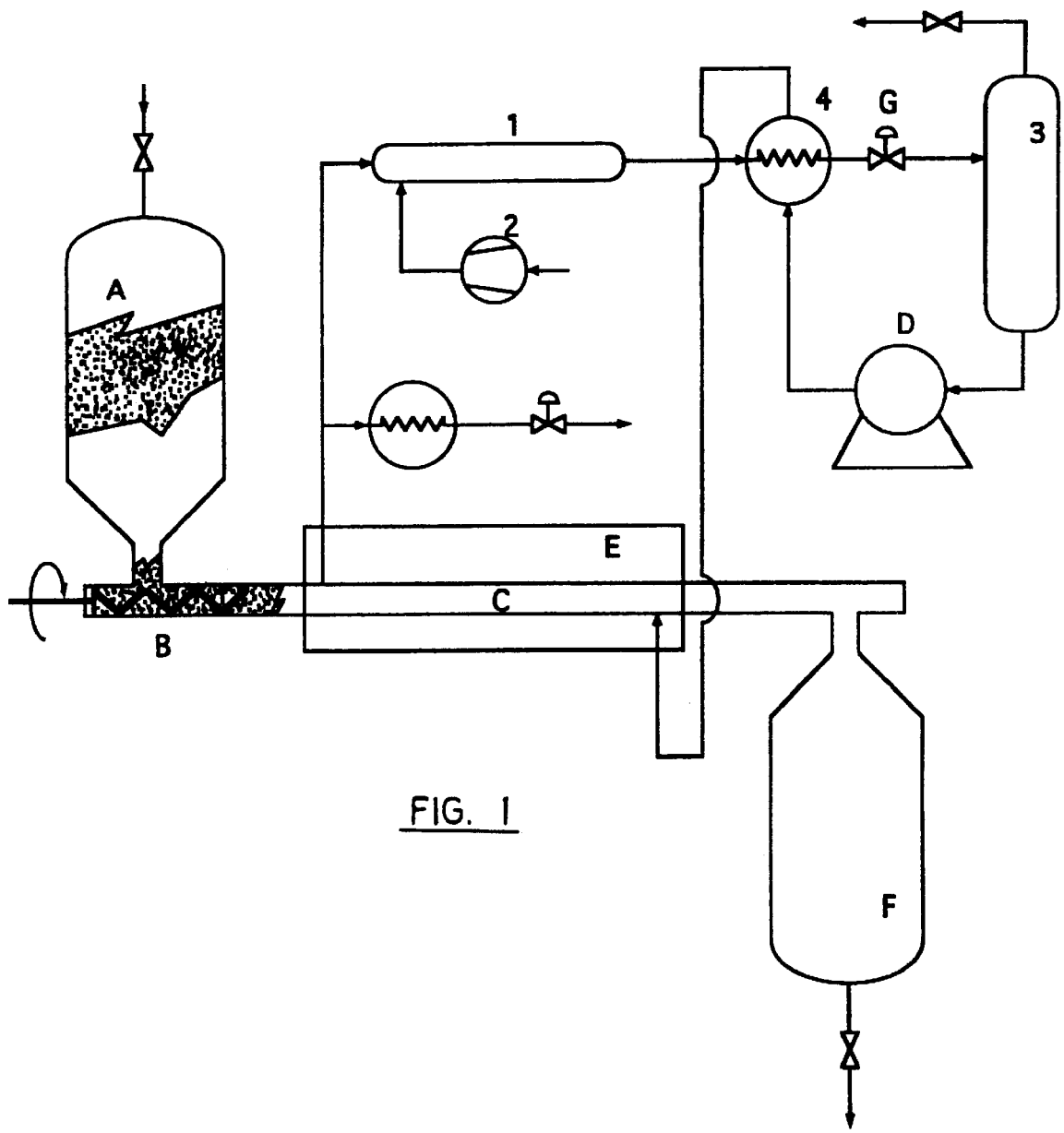
FIG. 1 is a diagram of the apparatus for the manufacture of activated carbon using supercritical water according to the present invention.
Figure 2:
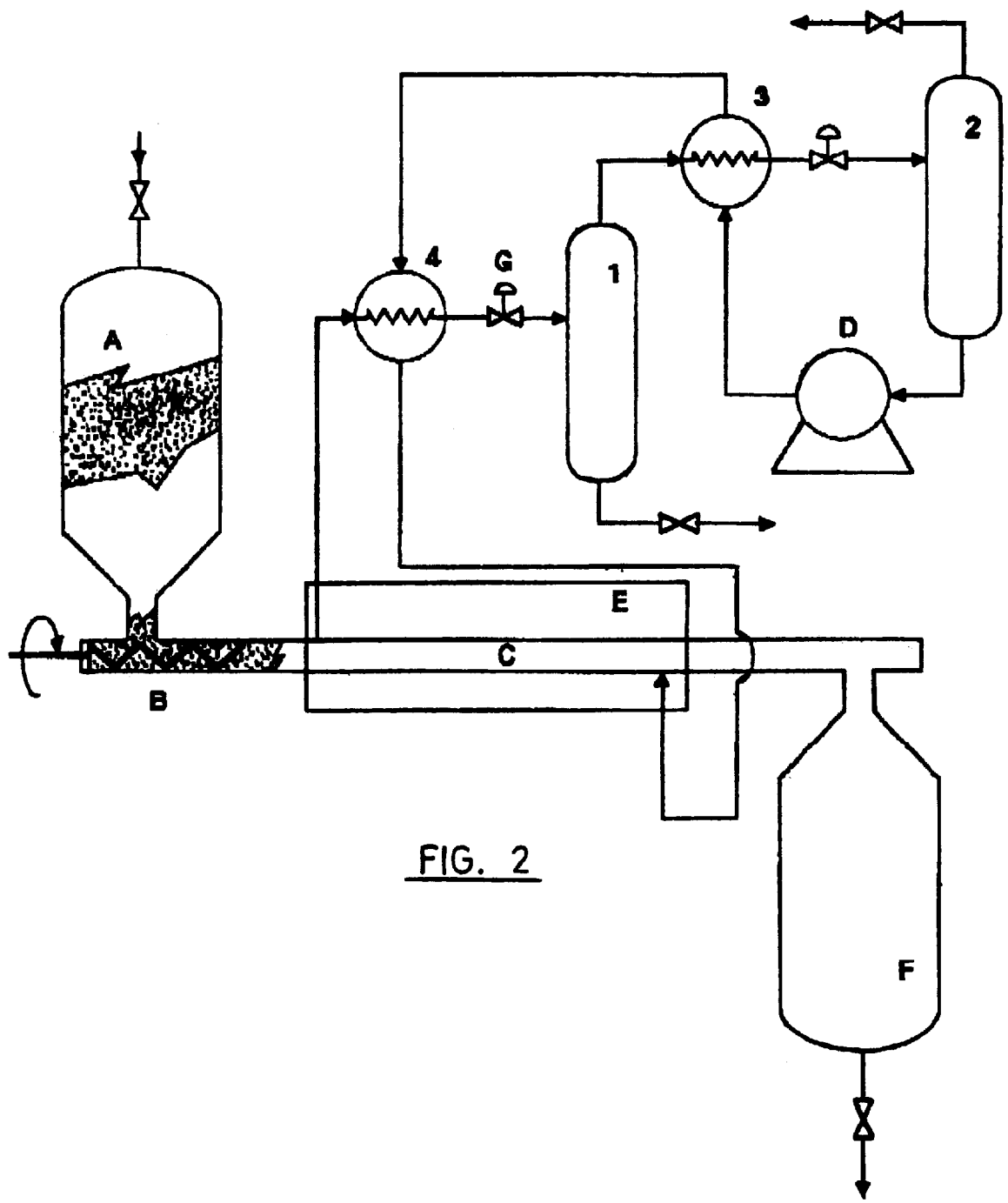
FIG. 2 is a diagram of the apparatus for the manufacture of activated carbon using supercritical carbon dioxide according to the present invention.

According to the diagrams in FIGS. 1 and 2, the char or mineral coal is loaded in the corresponding deposit A). An endless screw B), or similar device, is in charge of making it circulate continuously through the activation chamber (C). The residence time in this chamber is determined by the dimensions of the same and by the rotation speed of the endless screw.

Activation takes place by circulating water or carbon dioxide through the activation chamber by means of a high pressure pump (D). The operation temperature in the chamber is achieved by means of a oven (E) which contains it. Another process which can be used instead of a oven, and which is extremely effective in heating the char contained in the activation chamber, is applying an appropriate potential difference at the ends of this chamber. As a consequence of the electrical resistivity of the char, it becomes heated in a direct and effective manner. The supercritical fluid circulates counter-current-wise in relation to the char along the activation chamber, and reacts with it at the same time as it removes the extracted substances and the activation products.

The char which is transformed into activated carbon after going through the activation chamber is pushed to the corresponding deposit (F) where it is stored.

The whole system is maintained at the working pressure by means of pressure regulation valves (G).

When supercritical water is used as activating agent (see FIG. 1), the extracted products can be collected for their future use or are otherwise destroyed by supercritical oxidation. In the latter case, the current of water which comes out of the activation chamber (C) is driven to a reactor (1) where it is oxidized with air under supercritical conditions, which is injected with the aid of a compressor (2). The products obtained in this oxidation are essentially $H_2O$, $CO_2$, $N_2$ and $O_2$. The current of supercritical water which emerges from the reactor (1) is cooled down to subcritical conditions, T<374° C., and the CO2, N2, O2 and other gases, are removed by stripping in a separator. The water which leaves the separator is heated in the heat exchanger (4) and is returned clean and in supercritical conditions to the activation chamber (c).

When the activating agent employed is carbon dioxide (see FIG. 2), in order for the activation process to be cost-effective, it is necessary to recover the carbon dioxide. In order to do this, the extracted substances and the activation products are separated from the carbon dioxide by fractionation of the current which leaves the activation chamber (C), by successive reductions of the pressure and temperature at separators (1) and (2). The recovered carbon dioxide is heated in heat exchangers (3) and (4) and is introduced again into the activation chamber (C), pushed by the high pressure pump (D).

The apparatus of FIG. 1 can also be used to regenerate spent activated carbon (according to the process described in Patent Application ES 9201729) using supercritical water. According to said process, the spent activated carbon would be placed in deposit (A) and pushed through the activation chamber (now regeneration chamber). The supercritical water which circulates through the regeneration chamber would extract the adsorbed compounds, which would be subsequently destroyed by supercritical oxidation. The only aim of the regeneration process is to desorb the substances retained by the activated carbon and hence, the regeneration temperature shall be lower than that used for activation. In general, the regeneration temperature shall be below 450° C., because at higher temperatures the activation process begins to take place at a considerable rate, which would give rise to a loss in the mass of the activated carbon.

What is claimed is:

1. A process for the manufacture of activated carbon comprising the steps of:

providing a carbonized starting material; and activating the carbonized starting material using an activating agent wherein the activating agent is supercritical water, supercritical carbon dioxide or supercritical water and supercritical carbon dioxide (critical point of water: T=374degrees Celsius and P=215 bar; critical point of carbon dioxide: T=31 degrees Celsius and P=72 bar).

2. The process of claim 1 wherein the providing step comprises carbonizing a starting material.

3. The process of claim 1 wherein the provided carbonized starting material is mineral coal, the activating step further comprises progressively heating the starting material with the activating agent, and the process further comprises the step of extracting substances contained in the starting material, said extracting step performed by the activating agent.

4. The process of claim 3, wherein the activating agent is supercritical water and the substances extracted are destroyed by oxidation with the supercritical water.

5. The process according to claim 3 wherein the activating agent is supercritical carbon dioxide and the process further comprises the step of recycling the activating agent.

\* \* \* \* \*